United States Patent
Chang et al.

(10) Patent No.: US 7,382,718 B2
(45) Date of Patent: Jun. 3, 2008

(54) TRANSMITTING AND RECEIVING METHOD FOR REDUCING DISTORTION CAUSED BY A TIME-VARYING CHANNEL IN AN ORTHOGONAL FREQUENCY DIVISION MULTIPLEX SYSTEM

(75) Inventors: Kyung-Hi Chang, Daejeon (KR);
Yun-Hee Kim, Daejeon (KR);
Yong-Soo Cho, Seoul (KR);
Kyung-Won Park, Jeollanom-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1058 days.

(21) Appl. No.: 10/334,354

(22) Filed: Dec. 31, 2002

(65) Prior Publication Data
US 2004/0114506 A1  Jun. 17, 2004

(30) Foreign Application Priority Data
Nov. 28, 2002 (KR) ............... 10-2002-0075014

(51) Int. Cl.
*H04L 5/04* (2006.01)
*H04L 27/00* (2006.01)
*H04J 11/00* (2006.01)
*G06F 15/00* (2006.01)

(52) U.S. Cl. .............. 370/204; 370/208; 370/210; 375/299; 708/404

(58) Field of Classification Search ........ 370/203–204, 370/208–210, 334; 375/267, 299, 347; 455/101–103, 455/501; 708/400–405
See application file for complete search history.

(56) References Cited

U.S. PATENT DOCUMENTS 6,144,711 A * 11/2000 Raleigh et al. ........... 375/347

(Continued)

FOREIGN PATENT DOCUMENTS

| KR | 2001-0104656 | 11/2001 |
| KR | 1020020014774 A | 2/2002 |
| WO | WO 99/14871 | * 3/1999 |

OTHER PUBLICATIONS

Muller A., OFDM transmission over time-variant multipath channels, Broadcasting Convention, IBC 1994, International Sep. 16-20, 1994, pp. 533-538.*

(Continued)

*Primary Examiner*—Chi Pham
*Assistant Examiner*—Tri H. Phan
(74) *Attorney, Agent, or Firm*—Blakely, Sokoloff, Taylor & Zafman LLP

(57) ABSTRACT

Disclosed is a transmitting and receiving method for reducing a time-varying channel distortion in an orthogonal frequency division multiplex (OFDM) system. In the present invention, the transmitter defines M sub-channels in one data group, mathematically analyzes a change of channel for each path causing a time-varying channel distortion in a high-speed mobile environment by approximation, calculates a weight value based on the mathematical analysis and assigns the calculated weight value to transmit data of each sub-channel. Subsequently, the receiver combines the signals of these M sub-channels and demodulates the combined signals. Accordingly, the present invention greatly reduces a distortion caused by the time-varying channel to improve a bit error rate and a channel estimation performance.

18 Claims, 14 Drawing Sheets

U.S. PATENT DOCUMENTS

| | | | | |
|---|---|---|---|---|
| 6,298,092 | B1 * | 10/2001 | Heath et al. | 375/267 |
| 6,741,658 | B1 * | 5/2004 | Ionescu | 375/267 |
| 6,755,329 | B2 * | 6/2004 | Thompson | 375/267 |
| 6,826,240 | B1 * | 11/2004 | Thomas et al. | 375/340 |
| 6,834,043 | B1 * | 12/2004 | Vook et al. | 370/310 |
| 7,031,250 | B2 * | 4/2006 | Vandenameele-Lepla | 370/206 |

OTHER PUBLICATIONS

Stantchev et al., Time-variant distortions in OFDM, Communications Letters, IEEE, vol. 4, Issue 10, Oct. 2000, pp. 312-314.*

Jeon et al., An Equalization Technique for Orthogonal Frequency-Division Multiplexing Systems in Time-Variant Multipath Channels, IEEE Transactions on Communications, vol. 47, No. 1, Jan. 1999, pp. 27-32.*

Ye, Li, et al., "Robust Channel Estimation For OFDM Systems With Rapid Dispersive Fading Channels", IEEE Transactions on Communications, vol. 46, No. 7, pp. 902-915, Jul. 1998.

Won Gi Jeon, et al., "An Equalization Technique For Orthogonal Frequency-Division Multiplexing Systems In Time-Variant Multipath Channels", IEEE Transactions on Communications, vol. 47, No. 1, Jan. 1999.

* cited by examiner

TRANSMITTING AND RECEIVING METHOD FOR REDUCING DISTORTION CAUSED BY A TIME-VARYING CHANNEL IN AN ORTHOGONAL FREQUENCY DIVISION MULTIPLEX SYSTEM

BACKGROUND OF THE INVENTION (a) Field of the Invention

The present invention relates to an orthogonal frequency division multiplex (hereinafter, referred to as "OFDM") system. More specifically, the present invention relates to a transmitting and receiving method for reducing a distortion caused by a time-varying channel in a high-speed mobile environment.

(b) Description of the Related Art

The OFDM system involves insertion of a cyclic prefix (CP) longer than the impulse response of a channel in a guard interval between adjacent OFDM symbols to eliminate the interference between the symbols, and thereby allows compensation of a fading channel distortion simply by using a single tap equalizer at the receiver. The OFDM system also allows rapid realization of a modulation/demodulation process at the transceiver by using an inverse fast Fourier transformer (IFFT) and a fast Fourier transformer (FFT).

These advantages of the OFDM system enable development of high-speed data transmission systems, for example, OFDM wireless communication systems including digital audio broadcasting (DAB), digital video broadcasting (DVB), digital terrestrial television broadcasting (DTTB), wireless local area network (LAN), wireless asynchronous transfer mode (ATM) or the like. Recently, these OFDM wireless communication systems have been actively studied as a core technology of the fourth generation mobile communication.

To improve the link budget of wireless channels, various multi-antenna OFDM technologies such as SFBC(Space-Frequency Block Coded)-OFDM, SFTC(Space-Frequency Trellis Coded)-OFDM, MRRC(Maximal Ratio Receiver Combining)-OFDM and so forth have been studied. But the OFDM systems with multiple antennas have a distortion caused by a time-varying channel as the OFDM systems with a single antenna, and hardly guarantee a high diversity gain at high speed mobile environment with multiple antennas, thereby deteriorating the performance.

A conventional method for solving the problem involves transmission of pilot symbols to estimate a time-varying channel distortion and compensation of the estimated distortion. In this method, however, the pilot symbols have to be transmitted prior to data symbols, causing a high overhead and a deterioration of performance due to the use of an estimated channel before one symbol.

SUMMARY OF THE INVENTION

It is an object of the present invention to solve the problems with the prior art and to reduce a distortion caused by a time-varying channel in a high-speed mobile environment in an OFDM system.

It is another object of the present invention to improve a channel-estimation performance and to reduce a time-varying channel distortion, thereby improving a bit error rate and acquiring a high diversity gain.

In one aspect of the present invention, there is provided a transmitting method, which is a signal transmitting method for an OFDM system using at least one antenna, the transmitting method including: (a) putting M adjacent sub-channels among N entire sub-channels in one group; (b) assigning a weight value to each transmit data of the respective sub-channels in the group; and (c) transmitting the data in the unit of groups with the weight value assigned thereto.

The step (b) includes: approximating a time-varying channel using a polynomial function, calculating a power leakage value affecting the adjacent sub-channels in a frequency domain using coefficients of the approximated polynomial function, and determining a weight value to be assigned to each transmit data based on the power leakage value.

The step (a) includes dividing the N entire sub-channels into N/M data groups, and the step (b) includes assigning the weight value calculated by using the approximated time-varying channel to the M adjacent sub-channels in each data group.

The step (a) includes: without channel information, putting M adjacent sub-channels in one data group and assigning a weight value to the M sub-channels in the data group according to the following equation:

$$(-1)^i \frac{(M-1)!}{i!(M-1-i)!}$$

where i is an index in the group.

The method further includes, with a time-varying channel distortion generated, arranging pilot signals in groups and assigning a weight value to the pilot signals less than the weight value of the transmit data when a power of the pilot signal is greater than a power of the transmit data, thereby reducing the time-varying channel distortion caused by the pilot signals.

In another aspect of the present invention, there is provided a receiving method, which is a signal receiving method for an OFDM system using at least one antenna, the receiving method including: (a) receiving signals having M adjacent sub-channels among N entire sub-channels in one group, each sub-channel in the group having a weight value assigned thereto; (b) combining the received signals of the sub-channels in the group; and (c) demodulating the combined signals.

The step (a) includes: taking FFT (Fast Fourier Transform) of the received signals and combining the M sub-channels in each data group by addition or subtraction according to a sign of the weight value. Here, the step (a) includes: taking FFT (Fast Fourier Transform) of the received signals and combining them by subtracting a signal of the sub-channel in the data group transmitted with a weight value having a negative (−) sign from a signal of the sub-channel transmitted with a weight value having a positive (+) sign, when the received signals have two sub-channels in one data group, with the signal assigned to the one sub-channel in the data group having an opposite sign to the signal assigned to the other sub-channel.

In further another aspect of the present invention, there is provided a transmitting and receiving method, which is a signal transmitting and receiving method for an OFDM system using at least one antenna, the transmitting and receiving method including: (a) putting M adjacent sub-channels among N entire sub-channels in one group; (b) assigning a weight value calculated by using an approximated time-varying channel to each transmit data of the M adjacent sub-channels in the group; (c) receiving signals and combining the received signals of the M sub-channels in each data group by addition or subtraction according to a sign of the weight value; and (d) demodulating the combined signals.

The step (a) includes: without channel information, putting M adjacent sub-channels in one data group and assigning a weight value to the M sub-channels in the data group according to the following equation:

$$(-1)^i \frac{(M-1)!}{i!(M-1-i)!}$$

where i is an index in the group. The step (c) includes: taking FFT of the received signals and combining the signals of the M sub-channels in each data group by addition or subtraction according to a sign of the weight value.

In still further another aspect of the present invention, there is provided a transmitting and receiving method, which is a signal transmitting and receiving method for an OFDM system using NTx transmit antennas and NRx receive antennas, the transmitting and receiving method including: (a) putting M adjacent sub-channels among N entire sub-channels in one group; (b) assigning a weight value to each transmit data of the M adjacent sub-channels in the group, and sending the transmit data through the NTx transmit antennas; (c) receiving the signals through the NRx receive antennas, and combining the signals of the M sub-channels in each data group for each antenna; and (d) demodulating the combined signals.

In particular, when the system is an SFBC(Space-Frequency Block Coded)-OFDM system, the step (b) includes transmitting the data group with a weight value assigned to the M adjacent sub-channels through the respective transmit antennas according to an SFBC orthogonal matrix. The step (c) includes: combining the signals of the M sub-channels of each data group from the receive antennas by addition or subtraction according to a sign of the weight value and then subjecting the received signals to SFBC combination. In this case, the step (b) includes: without channel information, putting M adjacent sub-channels in one data group, assigning a weight value to the M sub-channels in the data group according to the following equation and transmitting the signals through the respective transmit antennas according to the SFBC orthogonal matrix:

$$(-1)^i \frac{(M-1)!}{i!(M-1-i)!}$$

where i is an index in the group. The step (c) includes: combining the signals of the M sub-channels in each data group from the receive antennas by addition or subtraction according to a sign of the weight value and then subjecting the received signals to SFBC combination.

When the system is an MRRC(Maximal Ratio Receiver Combining)-OFDM system, the step (b) includes transmitting the data group with a weight value assigned to the M adjacent sub-channels through one transmit antenna. The step (c) includes: combining the signals of the M sub-channels of each data group from the NRx receive antennas by addition or subtraction according to a sign of the weight value and then subjecting the received signals to MRRC combination. In this case, the step (b) includes: without channel information, putting M adjacent sub-channels in one data group, assigning a weight value to the M sub-channels in the data group according to the following equation and transmitting the signals through one transmit antenna:

$$(-1)^i \frac{(M-1)!}{i!(M-1-i)!}$$

where i is an index in the group. The step (c) includes: combining the signals of the M sub-channels in each data group by addition or subtraction according to a sign of the weight value and then subjecting the received signals to MRRC combination.

When the system is an SFTC(Space-Frequency Trellis Coded)-OFDM system, the step (b) includes performing SFTC coding and transmitting the data group with a weight value assigned to the M adjacent sub-channels through the respective transmit antennas. The step (c) includes: combining the signals of the M sub-channels of each data group from the receive antennas by addition or subtraction according to a sign of the weight value and then subjecting the combined signals to SFTC decoding. In this case, the step (b) includes: without channel information, performing SFTC coding, putting M adjacent sub-channels in one data group, assigning a weight value to the M sub-channels in the data group according to the following equation and transmitting the signals through the respective transmit antennas:

$$(-1)^i \frac{(M-1)!}{i!(M-1-i)!}$$

where i is an index in the group. The step (c) includes: combining the signals of the M sub-channels in each data group from the receive antennas by addition or subtraction according to a sign of the weight value and then subjecting the combined signals to SFTC decoding.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Now, a description will be given as to the concept of the present invention.

Figure 1:
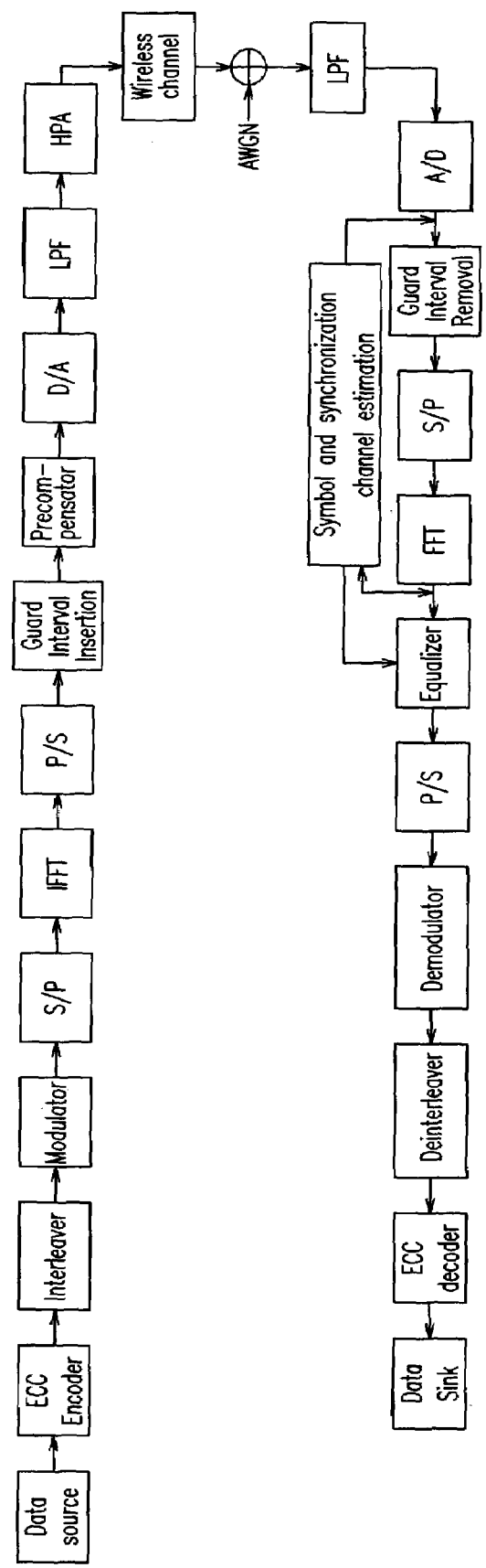
FIG. 1 is a block diagram of a transceiver in a general OFDM system.

FIG. 1 is a schematic view of a general OFDM system.

Generally, the OFDM system multiplexes N parallel transmit data with a different sub-carrier frequency, summates the multiplexed data and transmits them. Let the N parallel data be one symbol, N sub-carriers in a unit symbol have a mutual orthogonality to one another so that sub-carrier channels (i.e., sub-channels) have no effect on one another.

The OFDM signal in the time domain received through P-path channels is given by the following equation:

$$y(n) = \sum_{p=0}^{P-1} h_p(n)x(n-n_p) + w(n) \quad n=0,1,\ldots,N-1 \quad \text{[Equation 1]}$$

where n is a time domain index; $n_p$ is a discrete time-delay sample of the p-th path; x(n) is a transmit signal in the time domain; and w(n) is an additive white Gaussian noise (AWGN). The frequency-domain signal of the equation 1 is obtained by FFT and can be expressed as follows:

$$Y(k) = \left(\sum_{p=0}^{P-1} H_p(0)e^{-j2\pi n_p k/N}\right)X(k) + \sum_{m=0, m\neq k}^{N-1} \left(\sum_{p=0}^{P-1} H_p(k-m)e^{-j2\pi n_p m/N}\right)X(m) + W(k) \quad \text{[Equation 2]}$$

$$= \tilde{H}(k)X(k) + I(k) + W(k)$$

where k is a frequency domain index; N is an FFT size; X(k) is a transmit signal in the frequency domain; I(k) is a time-varying channel distortion term; and $H_p(k)$ is a single-tone frequency response of the p-th path when $X(k)=\delta(k)$ and can be expressed as follows:

$$H_p(k) = \frac{1}{N}\sum_{n=0}^{N-1} h_p(n)e^{-j2\pi kn/N} \quad \text{[Equation 3]}$$

The second term of the equation 2, I(k) is a time-varying channel distortion caused in a high-speed movement. When channel does not vary in one OFDM symbol, the following results are obtained: $H_p(k)=0$ for $k\neq 0$. However, when channel varies in one OFDM symbol, Hp(k) has a value even for $k\neq 0$ and thereby causes interference to the other sub-channels. Accordingly, when the time-varying channel distortion occurs, the bit error rate is hardly reduced even with an increase in the signal power.

Figure 2A:
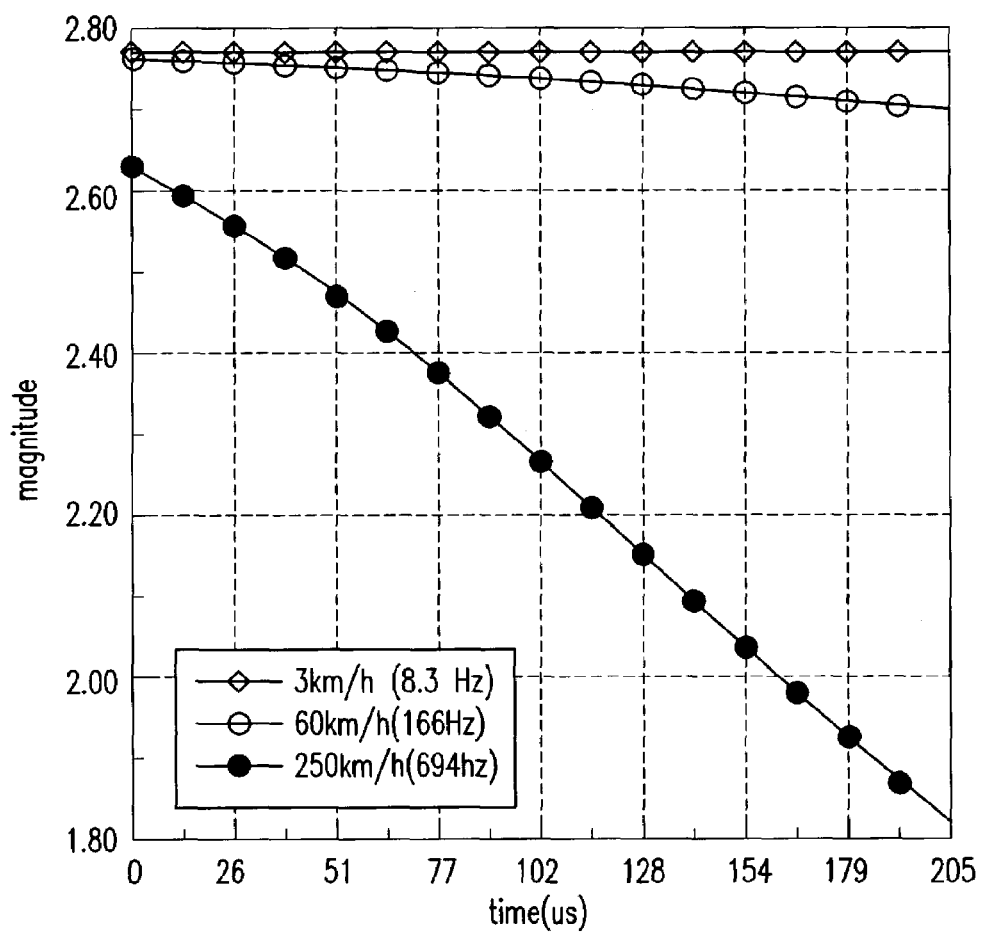
FIGS. 2a and 2b is an illustration showing a rate of change of a channel in one OFDM symbol in the time domain and a power leakage in the frequency domain.
Figure 2B:
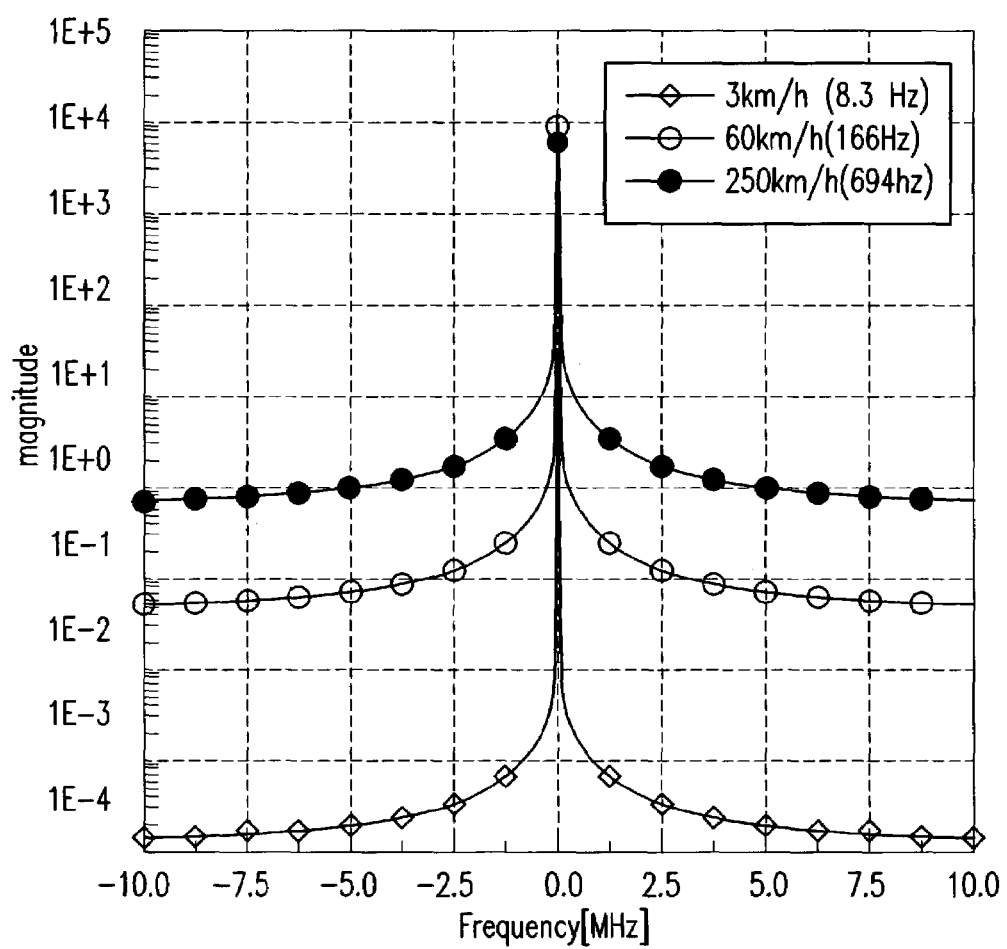

FIGS. 2a and 2b is an illustration showing a rate of change of a channel in one OFDM symbol and a power leakage in the frequency domain. In the figure, the FFT size is 4096, the sampling frequency 20 MHz, the carrier frequency 3 GHz.

Referring to (a) and (b) of FIG. 2, the rate of change of the channel in the time domain increases as the movement speed increases, thereby causing a great time-varying channel distortion in the frequency domain. To evaluate the noise level per sub-channel in the time-varying channel, the carrier-to-interference noise ratio (CINR) of the individual sub-channel is defined as follows:

$$CINR(k) = \frac{E\left[|\tilde{H}(k)X(k)|^2\right]}{E[|I(k)+W(k)|^2]} \quad \text{[Equation 4]}$$

where E represents an expected value. The CINR of the individual sub-channel is dependent upon the interference between adjacent channels caused by the time-varying channel, and the time-varying channel distortion is determined by the rate of change of the channel in one OFDM symbol. With a high rate of change of the channel in the time domain even with an insignificant AWGN power, the time-varying channel distortion power cannot be reduced, thereby hardly improving the bit error rate when the CINR is less than the required SNR for the given modulation order.

The channel estimation performance may be seriously deteriorated with a time-varying channel distortion. The frequency response of the channel to be estimated in the equation 2 is defined as $\tilde{H}(S_f \cdot i)$.

Let $S_f$ be a distance in the frequency domain between pilots inserted in between transmit data at the transmitter. Then the pilot-based LS (Least Square) channel estimation equation is given by the following equation:

$$\hat{H}_{LS}(S_f \cdot i) = \tilde{H}(S_f \cdot i) + \frac{I(S_f \cdot i) + W(S_f \cdot i)}{X(S_f \cdot i)}, \quad \text{[Equation 5]}$$

$$i = 0, 1, 2, \ldots, N/S_f - 1$$

The MSE (Mean Square Error) of the LS channel estimation is expressed as follows:

$$MSE_{LS} = E\left[(\hat{H}_{LS}(S_f \cdot i) - \tilde{H}(S_f \cdot i))^2\right], \quad [\text{Equation 6}]$$
$$= E[((I(S_f \cdot i) + W(S_f \cdot k))/X(S_f \cdot i))^2]$$
$$i = 0,1,2,\cdots, N/S_f - 1$$

In the equation 6, the time-varying channel distortion causes an increase in the mean square error of the channel estimation, $MSE_{LS}$.

As stated above, when the channel is changed in one OFDM symbol in a high-speed mobile environment, a time-varying channel distortion occurs, increasing the bit error rate and the mean square error of channel estimation.

To solve this problem, the present invention approximates the change of channel for each path causing the time-varying channel distortion in the equation 2 for mathematical analysis, and shows that the power leakage in the frequency domain functions as the same weight value for all the sub-channels. Based on this observation, the present invention can improve a channel estimation performance and reduce a time-varying channel distortion, thus improving a bit error rate and guaranteeing a high diversity gain.

For this purpose, the present invention defines M sub-channels as one data group, transmits them with an adequate weight value and combines the M sub-channels at the receiver, thereby reducing the time-varying channel distortion.

In addition, the pilot signals are transmitted in the same manner as transmit data, allowing a control of the power of the sub-channels adjacent to the pilot signals in consideration of the ratio of the pilot signal power to the total power.

Subsequent to the conventional multiple antenna method applied in the frequency domain, the above-mentioned transmission method is used for data transmission for each antenna. Once the adjacent channels are combined at the receiver, demodulation is performed according to the conventional multiple antenna method.

Figure 3:
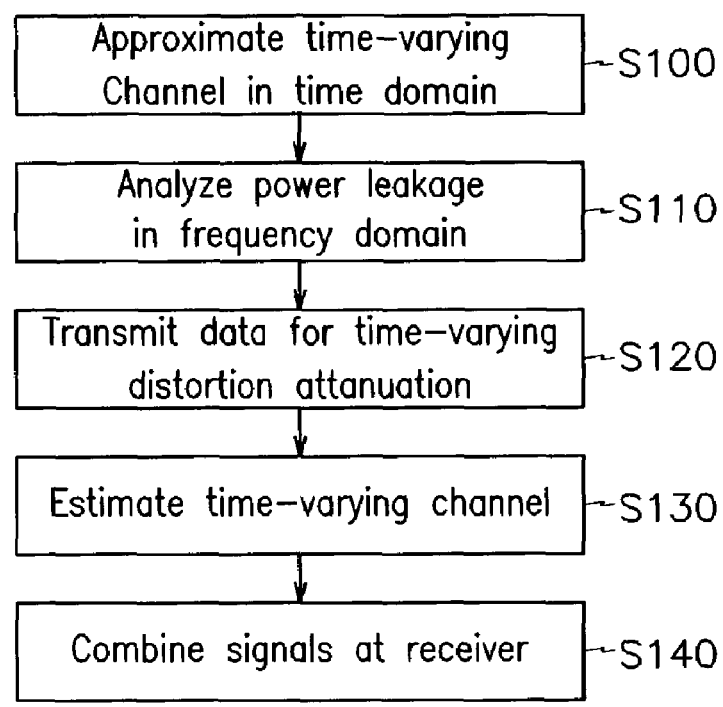
FIG. 3 is a flow chart showing an operation for reducing a time-varying channel distortion in an OFDM system according to an embodiment of the present invention.

FIG. 3 is a flow chart showing the transmitting and receiving method of the present invention. Referring to FIG. 3, the present invention consists of approximation of a time-varying channel in the time domain, analysis of a power leakage in the frequency domain, a data transmission and weight determination method for reducing a time-varying channel distortion, and channel estimation method adequate to the present data transmission method.

First, an approximation method is used for mathematical analysis of instantaneous time-varying channel distortion caused by a high-speed movement. In this case, the time-varying channel of the p-th path is approximated to a D-order polynomial function in one OFDM symbol according to the following equation, in step 100.

$$\hat{h}_p(n) = \sum_{d=1}^{D} a_{p,d} n^d + b_p, \quad [\text{Equation 7}]$$
$$= a_{p,D} n^D + a_{p,D-1} n^{D-1} + \cdots + a_{p,1} n + b_p$$
$$n = 0,1,\cdots, N-1$$

where the complex coefficients, $a_{p,d}$ and $b_p$ can be calculated according to the following LS (Least Square) equation:

$$\theta = (A^H A)^{-1} A^H y \quad [\text{Equation 8}]$$

$$\theta = \begin{bmatrix} a_{p,D} \\ \vdots \\ a_{p,1} \\ b_p \end{bmatrix}, \quad A = \begin{bmatrix} 0^D & \cdots & 0 & 1 \\ 1^D & \cdots & 1 & 1 \\ \vdots & \ddots & \vdots & \vdots \\ (N-1)^D & \cdots & N-1 & 1 \end{bmatrix},$$

$$y = \begin{bmatrix} h_p(0) \\ h_p(1) \\ \vdots \\ h_p(n-1) \end{bmatrix}$$

where $h_p(n)$ is the actual channel. The single tone frequency response of approximated time-varying channel $\hat{H}_p(n)$ is expressed as follows:

$$\hat{H}_p(k) = \frac{1}{N} \sum_{n=0}^{N-1} \hat{h}_p(n) e^{-j2\pi kn/N} \quad [\text{Equation 9}]$$

In the equation 7, a low-speed fading channel can be expressed as a first- or second-order polynomial function. The single tone frequency responses of the time-varying channel approximated to the first- and second-order polynomial functions are induced from the equation 9 as the equations 10 and 11, respectively:

$$\hat{H}_{p,1}(k) = \begin{cases} b_p + a_{p,1}(N-1)/2, & \text{for} \quad k = 0 \\ \frac{a_{p,1}}{2}(-1 + j\cot(\pi k/N)), & \text{for} \quad 1 \le k \le N-1 \end{cases} \quad [\text{Equation 10}]$$

$$\hat{H}_{p,2}(k) = \quad [\text{Equation 11}]$$
$$\begin{cases} \hat{H}_{p,1}(0) + a_{p,2}(N-1)(2N-1)/6, & \text{for} \quad k = 0 \\ \hat{H}_{p,1}(k) + a_{p,2} \cdot \frac{(N-2)e^{-j2\pi k/N}}{(1 - e^{-j2\pi k/N})^2}, & \text{for} \quad 1 \le k \le N-1 \end{cases}$$

In the equations 10 and 11, $a_{p,1} = a_{p,2} = 0$ when the channel does not change in one OFDM symbol, except for the case where k=0. So, there is no time-varying channel distortion generated.

Otherwise, when the channel changes in one OFDM symbol, neither $a_{p,1}$ nor $a_{p,2}$ is zero and a power leakage occurs over all the sub-channels, causing a time-varying channel distortion. The complex coefficients $a_{p,1}$ and $a_{p,2}$ are determined by the Doppler frequency. The instantaneous time-varying channel distortion caused by the time-varying channel in the equations 10 and 11 has an effect similar to the interference between adjacent channels caused by carrier frequency offsets, but its mathematical representation is different for every OFDM symbol. So, the instantaneous time-varying channel distortion is expressed by equations different for every OFDM symbol.

Figure 4A:
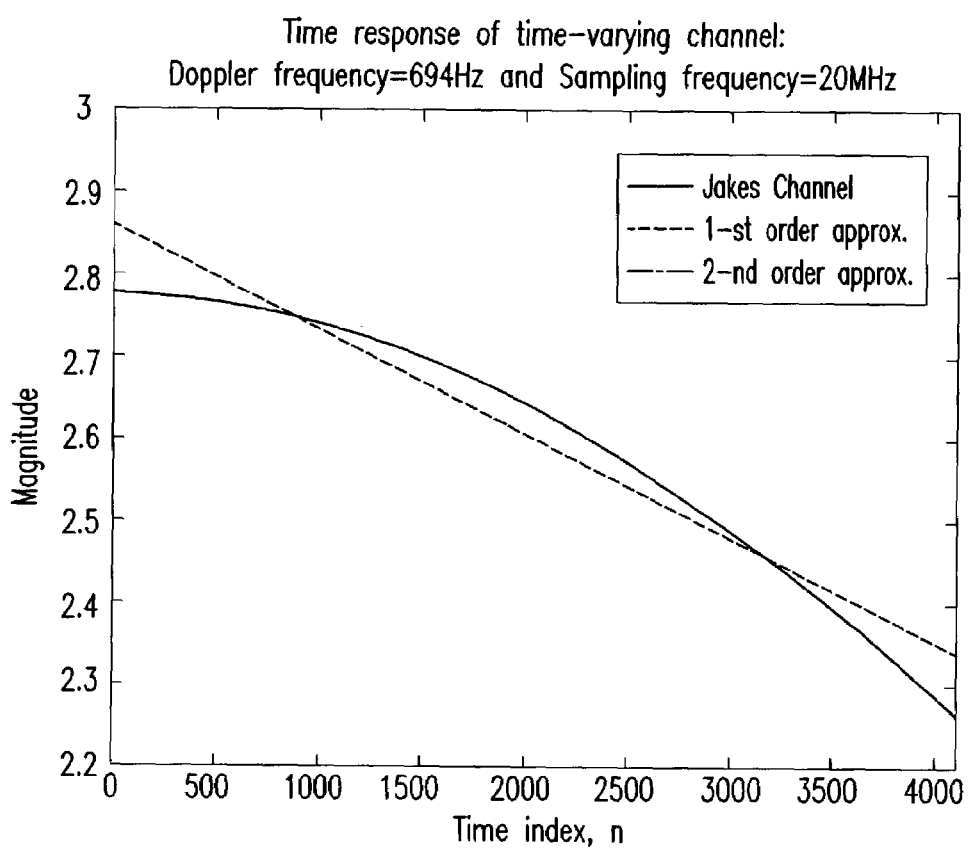
FIGS. 4a and 4b are illustrations showing a time-varying channel in the time domain approximated to first- and second-order functions and its frequency response characteristic, respectively.
Figure 4B:
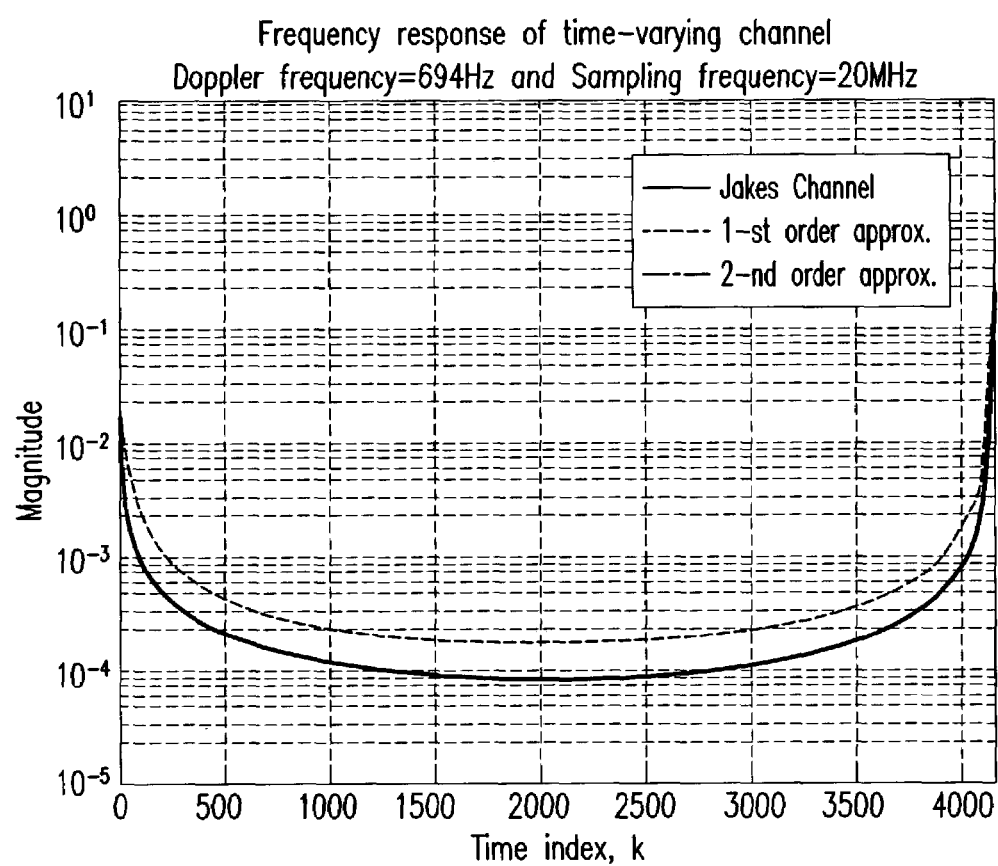

FIGS. 4a and 4b are illustrations showing approximation of the Jakes time-varying channel in the time domain to first- and second-order functions according to the above-stated method and the frequency response of the approximated time-varying channel. In the figure, the FFT size is 4096 and the sampling frequency is 20 MHz. As can be seen from FIGS. 4a and 4b, the time-varying channel is approximated to a second-order function with the same power leakage in the frequency domain even when the Doppler frequency is high.

Figure 5:
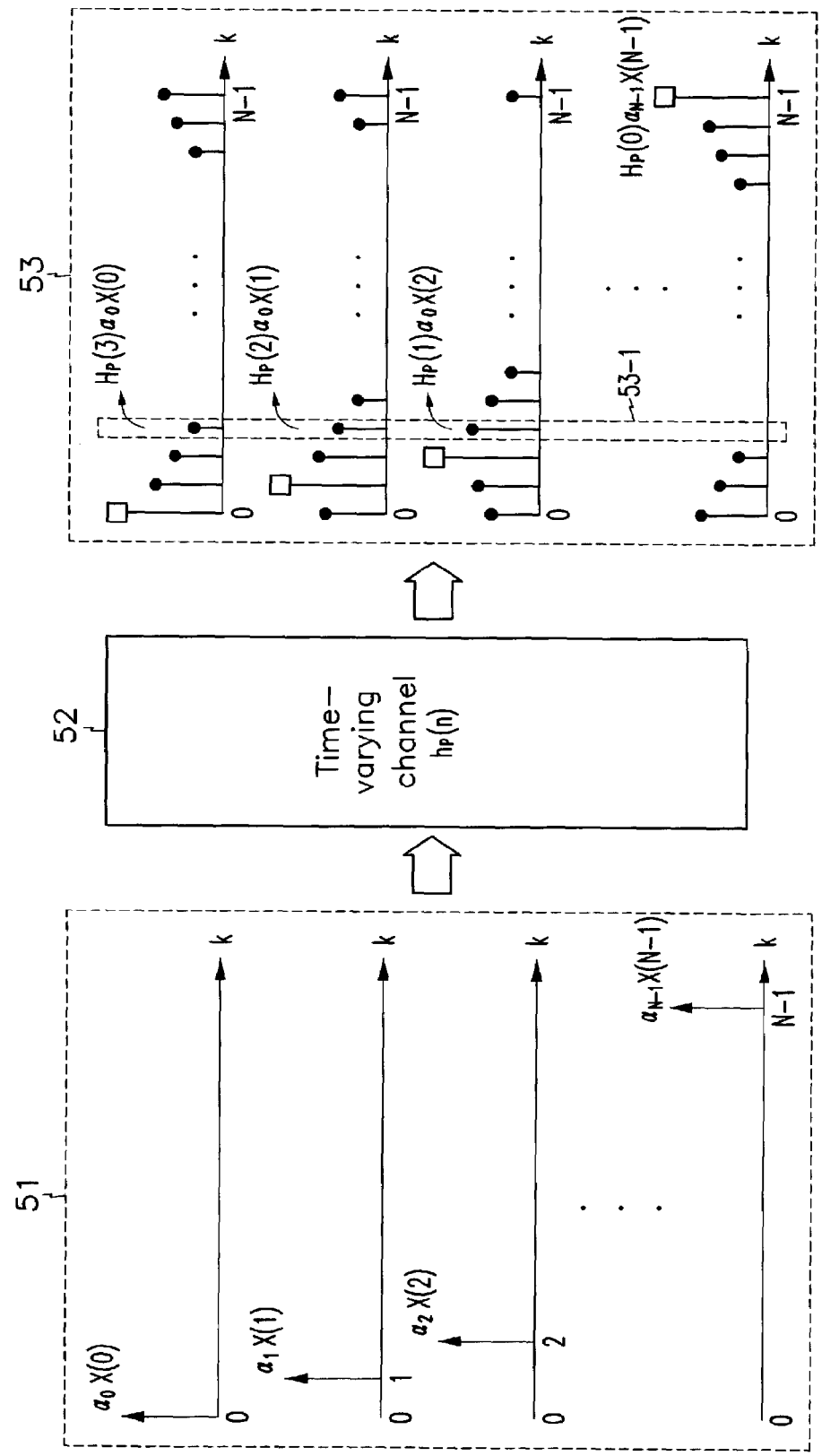
FIG. 5 is an illustration showing a time-varying channel distortion of each sub-channel in the frequency domain.

FIG. 5 is an illustration showing a power leakage when N data are transmitted one by one, for analysis of the time-varying channel distortion. Referring to FIG. 5, when N sub-channels are transmitted 51 one by one through a time-varying channel 52, the data transmitted through each sub-channel have a power leakage 53 over all the sub-channels. As a result, the signals received through the respective sub-channels are expressed by the sum 53-1 of the N adjacent channels according to the equation 2. As can be seen from FIG. 5, when the transmit signals of the respective sub-channels are the same, i.e., $X(k)=X_0$, the power leakage caused by the time-varying channel is subjected to circular shift to give the following equation:

$$Y(k) = H_p(0)X(k) + \sum_{m=0, m \neq k}^{N-1} H_p(m-k)X(m) \quad \text{[Equation 12]}$$

$$= \left(H_p(0) + \sum_{m=1}^{N-1} H_p(m)\right) X_0 \approx b_0 X_0, \text{ if } X(k) = X_0$$

In the equation 12, the time-varying channel distortion caused by a high-speed movement is zero when the same data are transmitted over all the sub-channels. Based on this result, it can be seen that the time-varying channel distortion can be reduced by transmitting the same data through the respective sub-channels with an appropriate weight value, in step 110.

Figure 6:
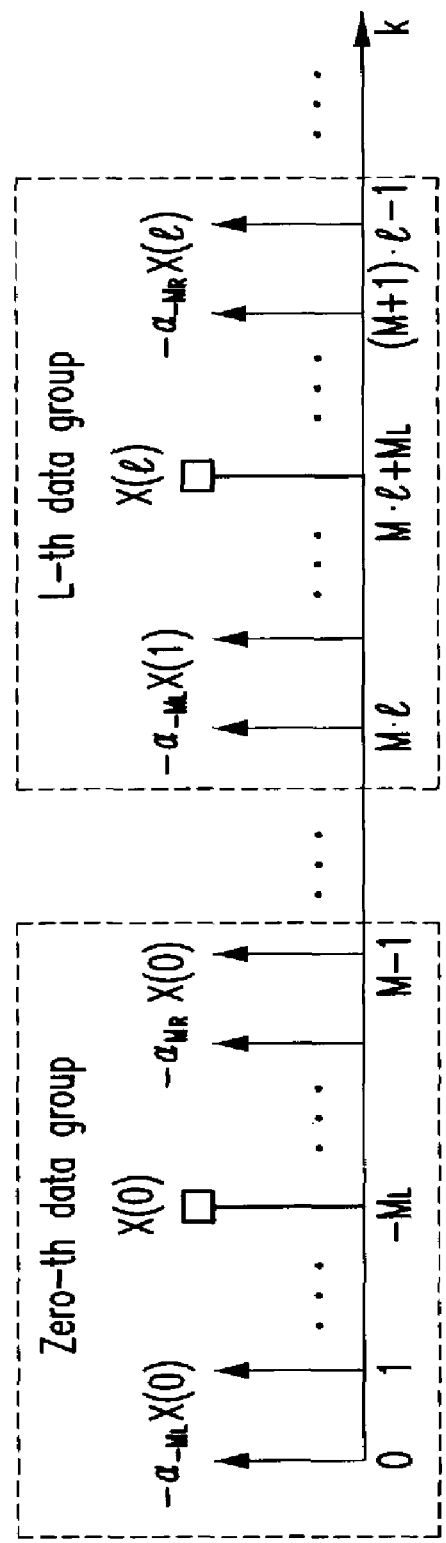
FIG. 6 is an illustration showing a symbol transmission method for reducing a time-varying channel distortion according to an embodiment of the present invention.

But the same data cannot be transmitted through all the sub-channels in the frequency domain as shown in the equation 12, so that the number of sub-channels for transmission of the same data has to be selected by taking into account the time-varying channel distortion and the bandwidth efficiency. Because the effect of reducing the time-varying channel distortion is diminished when transmitting the same data through a part of the sub-channels, it is necessary to assign a different weight value according to the position of the respective sub-channels. FIG. 6 is an illustration showing a sub-channel allocation method for reduction of the time-varying channel distortion. In FIG. 6, one data group is composed of $M(=M_R+M_L+1)$ sub-channels, and the number of effective sub-channels actually available for data transmission is N/M. An appropriate weight value is assigned to each sub-channel in the data group. The error between the term causing the time-varying channel distortion in the P-path channel and the signal with a weight value assigned to the same data for compensating for the time-varying channel distortion can be expressed by the following equation:

$$\varepsilon(k) = \sum_{p=0}^{P-1} H_p(k) e^{-j2\pi n_p k/N} - \sum_{m=-M_L, m \neq 0}^{M_R} \alpha_m \sum_{p=0}^{P-1} H_p(k+m) e^{-j2\pi n_p (k+m)/N}, \quad \text{[Equation 13]}$$

$$\text{for } k \neq -M_L, -M_L+1, \cdots, M_R$$

where $H_p(k)$ is the term causing the time-varying channel distortion in the p-th path; and $\alpha_m H_p(k+m)$ is the term eliminating the time-varying channel distortion in the p-th path. In the equation 13, the time-varying channel distortion of the received signal can be minimized by transmitting data with $\alpha_m$ as a weight value for minimizing the error $\epsilon(k)$. The weight value $\alpha_m$ can be calculated by the LS or MMSE (Minimum Mean Square Error) estimating equation and is greatly dependent upon the rate of change of the channel in one OFDM symbol. Actually, the complex coefficients $a_{p,d}$ and $b_p$ can be estimated with a channel predictor and used to determine the optimal weight value, in step 120.

As shown in FIG. 6, sub-channels are assigned in the unit of data groups, and the signal in each data group is transmitted with an appropriate weight value. Taking FFT of the signal received through the P-path time-varying channel gives frequency-domain representation, expressed by the following equation:

$$Y(M \cdot l + j) = \sum_{m=0}^{N/M-1} \left( \sum_{p=0}^{P-1} H_p(M(l-m)+j-M_L) e^{-j2\pi n_p (M \cdot m + M_L)/N} - \sum_{\substack{i=-M_L \\ i \neq 0}}^{M_R} \alpha_i \sum_{p=0}^{P-1} H_p(M(l-m)+j-i-M_L) e^{-j2\pi n_p (M \cdot m + M^L + i)/N} \right) X(m) + W(M \cdot l + j), \quad \text{[Equation 14]}$$

$$l = 0, 1, \ldots, N/M - 1; \, j = 0, 1, \ldots, M - 1$$

In the equation 14, l is the group index in the frequency domain; and j is the sub-channel index in each group. To compensate for the channel distortion caused by the (M·l+$M_L$)-th sub-channel signal, the data with M-1 adjacent sub-channels multiplied by the weight value $\alpha_m$ are transmitted. Referring to the equation 14, the adjacent channels reduce the time-varying channel distortion caused by the (M·l+$M_L$)-th sub-channel. Because the data on M sub-channels are identical, the time-varying channel distortion can be combined as follows:

$$\overline{Y}(l) = Y(M \cdot l + M_L) - \sum_{j=0, j \neq Ml}^{M-1} Y(M \cdot l + j) \quad \text{[Equation 15]}$$

$$= \sum_{m=0}^{N/M-1} B(M(l-m))X(m) +$$

-continued $$W(M \cdot l) - \sum_{j=0, j \neq M_L} W(M \cdot l + j)$$

The combined time-varying channel distortion $B(M(l-m))$ is given by:

$$B(M(l-m)) = \sum_{p=0}^{P-1} H_p(M(l-m))e^{-j2\pi n_p(M \cdot m + M_L)/N} - \sum_{\substack{i=-M_L \\ i \neq 0}}^{M_R} \alpha_i \sum_{p=0}^{P-1} H_p(M(l-m)-i)$$

$$e^{-j2\pi n_p(M \cdot m + M_L + i)/N} -$$

$$\sum_{\substack{j=0 \\ j \neq M_L}}^{M-1} \begin{pmatrix} \sum_{p=0}^{P-1} H_p(M(l-m) + j - \\ M_L)e^{-j2\pi n_p(M \cdot m + M_L)/N} - \\ \sum_{\substack{i=-M_L \\ i \neq 0}}^{M_R} \alpha_i \sum_{p=0}^{P-1} H_p(M(l-m) + \\ j - i - M_L)e^{-j2\pi n_p(M \cdot m + M^L + i)/N} \end{pmatrix}$$ [Equation 16]

In the equations 15 and 16, the time-varying channel distortion term $B(M(l-m))$ generated by combining the sub-channels between adjacent channels is less than the channel distortion term $H_p(k-m)$ generated in one OFDM or the channel distortion term in the equation 14.

Figure 7:
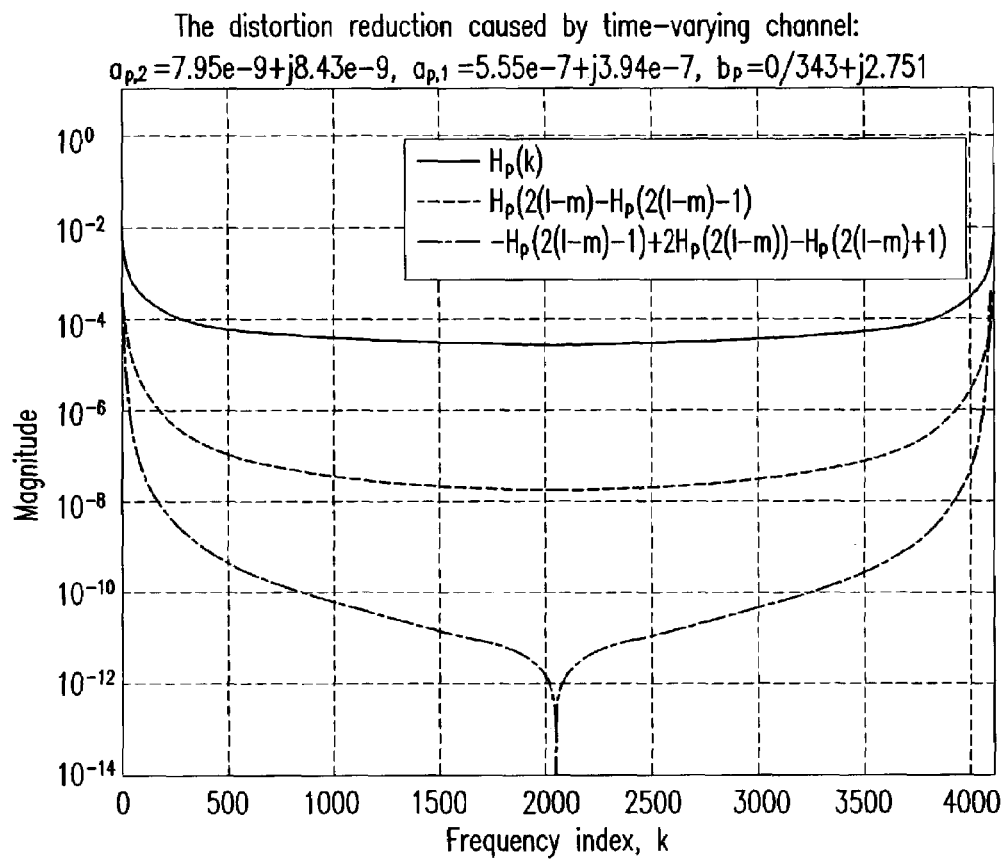
FIG. 7 is an illustration showing reduction of a time-varying channel distortion according to an embodiment of the present invention.

FIG. 7 shows the effect of reducing the time-varying channel distortion according to the present invention for the time-varying channel approximated to a second-order function with coefficients of $a_{p,2}$=7.95e−9+j8.43e−9, $a_{p,1}$=5.55e−7+j3.94e−7 and $b_p$=0.34321−j2.7511. Here, the FFT size is 4096, the sampling frequency 25 MHz, M=2, MR=1, ML=0, alpha~=1.

If the transmitter has accurate channel information, the optimal coefficients can be calculated from the equation 13. But this is difficult to realize, because feedback information from the receiver or a channel predictor at the transmitter is needed, increasing the complexity of the transceiver.

Therefore, the complexity of the operation can be reduced only by calculating a weight value for reduction of time-varying channel distortion without channel information at the transmitter. When the time-varying channel distortion $H_p(k)$ linearly decreases in a circular symmetric way with respect to k=0, it is reasonable to assign the weight value of each data group symmetrically. Thus without channel information at the transmitter, the weight value can be calculated according to the following equation:

$$\alpha_{i-M_L} = (-1)^i \frac{(M-1)!}{i!(M-1-i)!}, i = 0, 1, \cdots, M-1$$ [Equation 17]

When the weight value is normalized to $\alpha_0$ in the equation 17, the weight value of $X(M \cdot l + M_L)$ becomes "1". The weight values are given as $\alpha_0$=1 and $\alpha_1$=−1 for M=2, $M_R$=1 and $M_L$=0 in the equation 17; $\alpha_{-1}$=1, $\alpha_0$=−2 and $\alpha_{-1}$=1 for M=3, $M_R$=1 and $M_L$=1; and $\alpha_{-1}$=1, $\alpha_0$=−3, $\alpha_{-1}$=3 and $\alpha_{-2}$=1 for M=4, $M_R$=2 and $M_L$=2.

Referring to FIG. 7, $H_p(k)$ is the power leakage for a general data transmission method; $H_p(2(l-m))-H_p(2(l-m)-1)$ is the power leakage caused by a time-varying channel for M=2, $M_R$=1, $M_L$=1 and $\alpha$=1 in the equation 14; and $-H_p(2(l-m)-1)+2H_p(2(l-m))-H_p(2(l-m)+1)$ represents the reduction of the time-varying channel distortion obtained by the combination of sub-channels in the group according to the equation 15.

Now, a description will be given as to a method for reducing a time-varying channel distortion without channel information at the transmitter for a single-input single-output (SISO) OFDM system and an OFDM system with multiple antennas according to an embodiment of the present invention. Here, M=2, $M_R$=1 and $M_L$=0 in consideration of simplification of equations and coherence bandwidth. In the embodiment of the present invention, data are transmitted according to the following equation:

$$X(l+1)=-\alpha X(l), l=0,2,4,\ldots,N-2$$ [Equation 18]

Because the transmitter does not have channel information in the embodiment of the present invention, it is reasonable that $\alpha$=1 in the above equation for a general data, and $\alpha \leq 1$ for a pilot signal in consideration of the total power.

In the following description concerning the embodiment of the present invention for a SISO OFDM system and OFDM systems with multiple antennas such as SFBC-OFDM, MRRC-OFDM, and SFTC-OFDM systems, it is assumed that M=2, $M_R$=1, and $M_L$=0 for the sub-channel group size, $\alpha$=1, and that channel information is not available at the transmitter, thus the weight value being given by the equation 17. But the sub-channel group size and the number of antennas are not specifically limited to the above range in the present invention and may be variously modified.

In the case of a SISO OFDM, the received OFDM signal in the frequency domain can be expressed as follows:

$$Y(2l+j) = \sum_{m=0}^{N/2-1} \left[ \sum_{p=0}^{P-1} (H_p(2(l-m)+j) - \alpha H_p(2(l-m)+j+1)) \right.$$

$$\left. e^{-j2\pi n_p/N} \right) e^{-j2\pi n_p(2m)/N} ] X(m) + W(2k+j)$$

$$l = 0, 2, \cdots, N/2-1; \quad j = 0, 1$$ [Equation 19]

Here, the term $H_p(2(l-m)+j)-\alpha H_p(2(l-m)+j-1)e^{-j2\pi n_p/N}$ reduces the time-varying channel distortion caused by a high-speed movement. Even and odd sub-channels are arranged according to the equation 18 and combined together, giving the following equation:

$$\overline{Y}(l) = Y(2l) - Y(2l+1)$$

[Equation 20]

$$= \sum_{m=0}^{N/2-1}\left[\sum_{p=0}^{P-1}(-\alpha H_p(2(l-m)-1)e^{-j2\pi n_p/N} + (1+\alpha e^{-j2\pi n_p/N})\right.$$

$$\left. H_p(2(l-m)) - H_p(2(l-m)+1))e^{-j2\pi n_p(2m)/N}\right]X(m) + W(2l) - W(2l+$$

$$= X(l)\overline{H}(l) + \overline{I}(l) + N(l)$$

The required channel $\overline{H}(k)$, the interference between adjacent channels $\overline{I}(k)$ and the AWGN $N(k)$ are given as follows:

[Equation 21]

$$\overline{H}(l) = \sum_{p=0}^{P-1}(-\alpha H_p(-1)e^{-j2\pi n_p/N} + (1+\alpha e^{-j2\pi n_p/N})$$

$$H_p(0) - H_p(1))e^{-j2\pi n_p(2l)/N}$$

$$\overline{I}(l) = \sum_{\substack{m=0\\m\neq l}}^{N/2-1}\left[\sum_{p=0}^{P-1}\left(\begin{array}{c}-\alpha H_p(2(l-m)-1)e^{-j2\pi n_p/N} + (1+\alpha e^{-j2\pi n_p/N})\\H_p(2(l-m)) - H_p(2(l-m)+1)\end{array}\right)e^{j2\pi n_p(2m)/N}\right]X(m)$$

$$N(l) = W(2l) - W(2l+1)$$

When transmitting signals are opposite in phase to each other through adjacent channels, the time-varying channel distortion term $\overline{I}(l)$ of the equation 21 is attenuated by the adjacent channels, resulting in the reduction of the time-varying channel distortion power and decrease of bandwidth efficiency to half. Also, power gain of 3 dB is obtained due to the noise averaging effect.

In the sub-channel assignment of the equation 18, the target channel is not $\tilde{H}(k)$ of the equation 2 but $\tilde{H}(l)$ of the equation 20. It is therefore necessary that the adjacent channels of the pilot signal transmit signals opposite in phase to pilot signal, in order to estimate the required channel accurately. Since the pilot signal is typically transmitted with boosted power higher than the other data channels, the power leakage of the pilot signal has a great effect compared with the other sub-channels. Thus the signal of the opposite phase in the adjacent channels needs to be boosted at the power level corresponding to the pilot signal, which may increase the pilot signal power. It is thus important to assign an appropriate power level by taking into account these two effects. The channel estimated by the LS method using the pilot signal is expressed by the following equation:

$$\hat{H}(S_f \cdot i) = \overline{H}(s_f \cdot i) + \frac{\overline{I}(S_f \cdot i) + N(S_f \cdot i)}{X(S_f \cdot i)},$$

[Equation 22]

$$i = 0, 2, 4, \ldots, N/S_f - 2$$

The mean square error (MSE) between the target channel and the estimated channel can be expressed by the following equation:

$$MSE = E[|\hat{H}(S_f \cdot i) - \overline{H}(S_f \cdot i)|^2] < MSE_{LS}$$

[Equation 23]

In the equation 23, the MSE is decreased due to the reduction of the time-varying channel distortion.

An OFDM system with multiple antennas can be used to improve a link budget in the wireless environment. However, in this case, a satisfactory diversity gain is hardly acquired due to the time-varying channel distortion in a high-speed mobile environment. To guarantee both the diversity gain and the reduction of the time-varying channel distortion, the present invention employs the time-varying channel distortion reduction method in combination with the conventional OFDM system with multiple antennas.

Hereinafter, an embodiment of the present invention employing the above-stated transmitting and receiving method will be described in detail with reference to the accompanying drawings.

Figure 8:
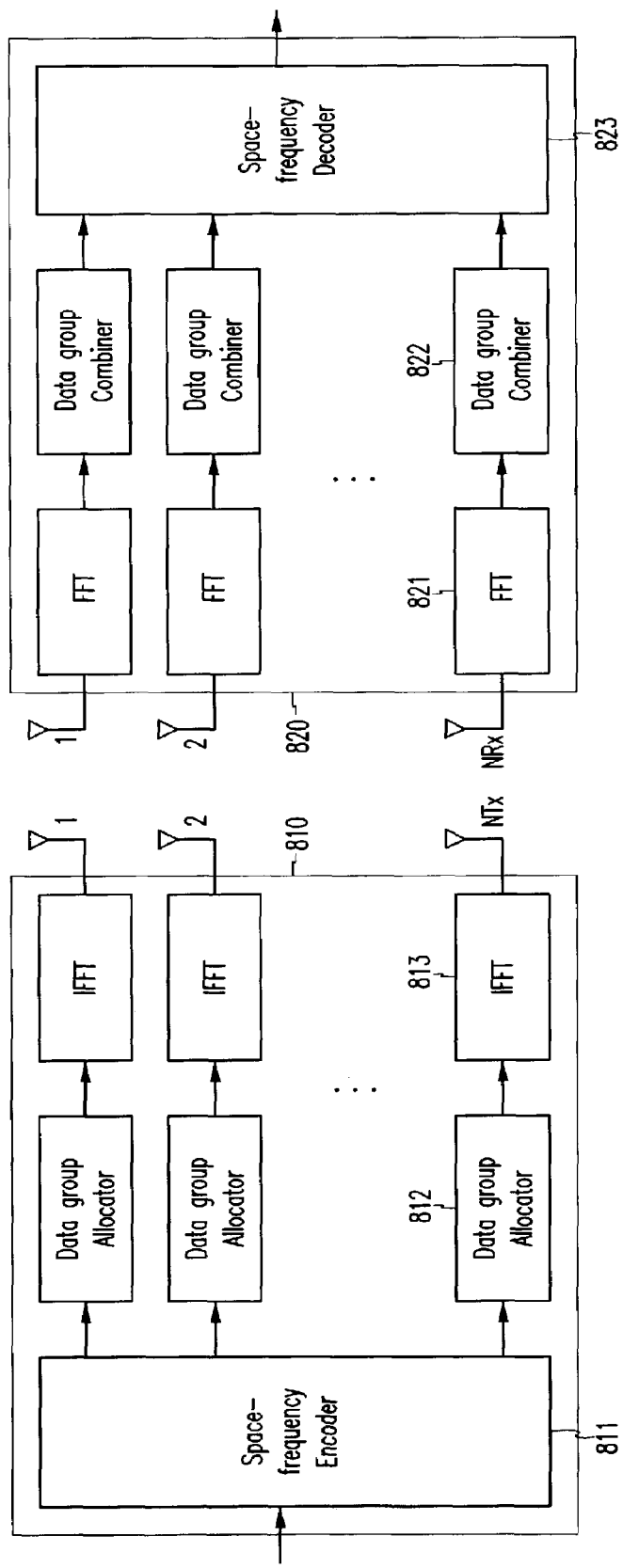
FIG. 8 is a block diagram of an OFDM system -with multiple antennas according to a first embodiment of the present invention.

FIG. 8 is a block diagram of an MIMO-OFDM system according to a first embodiment of the present invention.

Referring to FIG. 8, the MIMO-OFDM system comprises a transmitter 810 including a space-frequency encoder 811, a data group allocator 812, IFFTs 813 and a plurality of transmit antennas 1~NTx; and a receiver 820 including a plurality of receive antennas 1~NRx, FFTs 821, a data group combiner 822 and a space-frequency decoder 823.

Once a binary source is generated, the transmitter 810 performs QAM or PSK modulation of the source according to the modulation method and then generates data through the space-frequency encoder 811. The data group allocator 812 allocates sub-channels to the corresponding sub-carrier group with a weight value, and performs modulation for the respective data groups so as to eliminate a time-varying channel distortion. The individual data groups are OFDM-modulated through the IFFT 813 and transmitted via the corresponding transmit antennas 1~NTx. Here, the frequency-space coding method may include SFBC or SFTC.

The OFDM signals from the transmitter 810 are received via the respective receive antennas 1~NRx of the receiver 820 and OFDM-demodulated through the respective FFTs 821. The demodulated signals are combined between adjacent channels for each receive antenna through the data group combiner 822, and decoded by the frequency-space decoder 823.

For the OFDM system with multiple transmit antennas NTx and receive antennas NRx, when the data are transmitted in the same manner as described in FIG. 6, the residual time-varying channel distortion can be expressed as follows:

$$\varepsilon(k) = \sum_{nTx=1}^{NTx}\sum_{nRx=1}^{NRx}\sum_{p=0}^{P-1}\left[H_{nTx,nRx,p}(k)e^{-j2\pi n_p k/N} - \sum_{m=-M_L, m\neq 0}^{M_R}\alpha_m H_{nTx,nRx,p}(k+m)e^{-j2\pi n_p(k+m)/N}\right]$$

[Equation 24]

for $k \neq -M_L, -M_L+1, \cdots, M_R$ where $H_{nTx,nRx,p}(k)$ is the single-tone frequency response of a time-varying channel formed between the nTx-th transmit antenna and the nRx-th receive antenna. When channel information between the respective antennas is available at the transmitter, the weight value $\alpha_m$ is estimated by the LS or MMSE estimation method.

Now, the features of the MIMO-OFDM method for a time-varying channel according to the present invention will be described in detail by way of the SFBC-OFDM system with two transmit antennas and one receive antenna.

Figure 9:
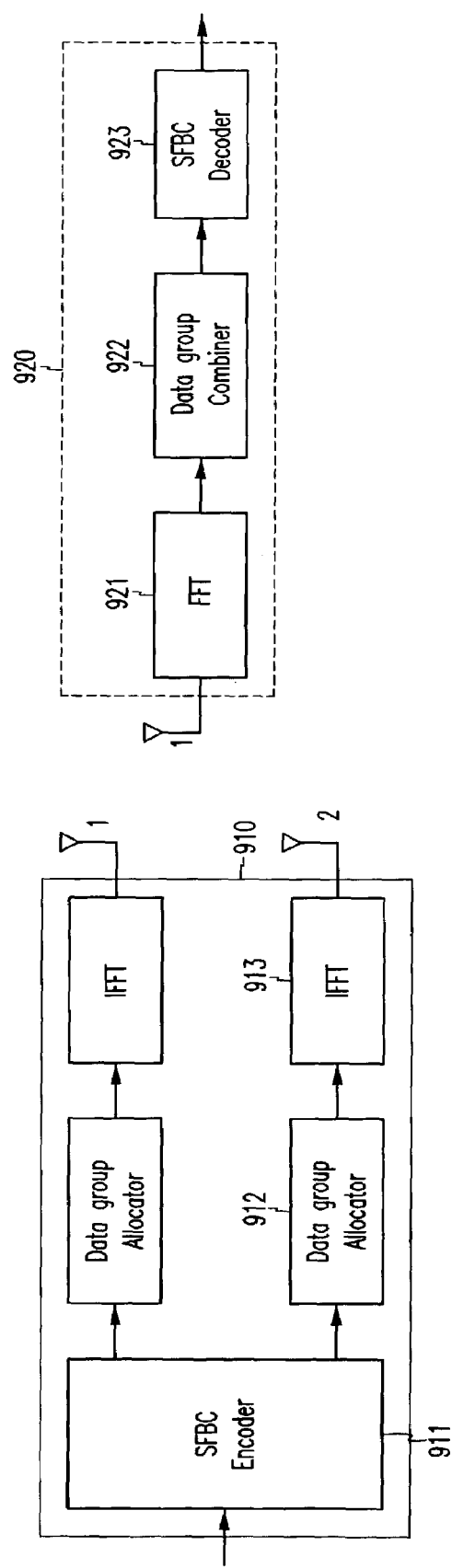
FIG. 9 is a block diagram of an SFBC-OFDM system for reducing a time-varying channel distortion according to a second embodiment of the present invention.
Figure 10:
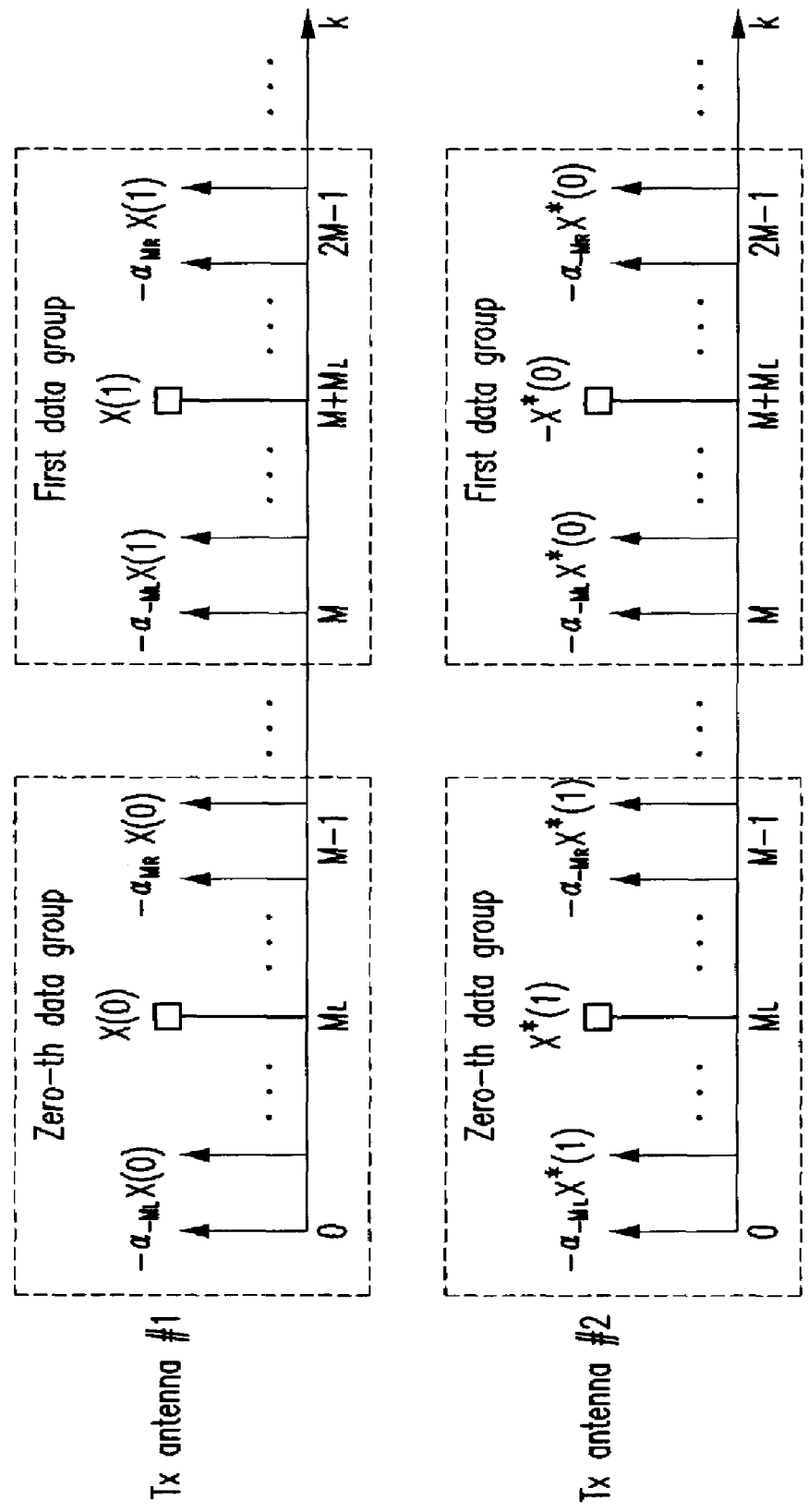
FIG. 10 is an illustration showing an example of a symbol transmission method of each antenna in the SFBC-OFDM system shown in FIG. 9.

FIG. 9 is a block diagram of an SFBC-OFDM system according to a second embodiment of the present invention, and FIG. 10 is an illustration showing an example of a symbol transmission method of the individual antenna in the SFBC-OFDM system shown in FIG. 9.

Referring to FIG. 9, the transmission method of the respective antennas is the same as the above-stated transmission method for reducing the time-varying channel distortion, excepting that an SFBC encoder 911 is used for SFBC coding of data groups between two adjacent channels.

In the SFBC structure, the performance deteriorates when the size of one sub-channel group is greater than the coherence bandwidth. It is thus assumed in the second embodiment of the present invention that M=2, $M_R$=1, and $M_L$=0. In this case, two channels are formed between the transmit antennas and the receive antenna, so that the received OFDM signal at one receive antenna can be expressed by the following equation:

$$Y(2l+j) = \sum_{m=0}^{N/2-1}\left[\sum_{p=0}^{P-1}(H_{1,p}(2(l-m)+j) - \right.$$

[Equation 25]

-continued $$\left. \alpha H_{1,p}(2(l-m)+j-1)e^{-j2\pi n_p/N})e^{-j2\pi n_p(2m)/N}\right]X_1(m) +$$

$$\sum_{m=0}^{N/2-2}\left[\sum_{p=0}^{P-1}(H_{2,p}(2(l-m)+j) - \right.$$

$$\alpha H_{2,p}(2(l-m)+j-1)e^{-j2\pi n_p/N})$$

$$\left. e^{-j2\pi n_p(2m)/N}\right]X_2(m) + W(2k+j),$$

for $l = 0, 1, 2, \cdots, N/2-1$; and $j = 0, 1$ where $H_{1,p}(k)$ is the single-tone frequency response of a channel formed between the first transmit antenna and the receive antenna; and $H_{2,p}(k)$ is the single-tone frequency response of a channel formed between the second transmit antenna and the receive antenna. The equation 25 may be combined with the equation 20 as follows:

$$\bar{Y}(l)=Y(2l)-Y(2l+1)=X_1(l)\bar{H}_1(l)+X_2(l)\bar{H}_2(l)+\bar{I}_1(l)+\bar{I}_2(l)+N(l)$$

[Equation 26]

Here, the channel $\bar{H}_1(l)$ between the first transmit antenna and the receive antenna, the channel $\bar{H}_2(l)$ between the second transmit antenna and the receive antenna, and the time-varying channel distortion caused by the individual channels are expressed as follows:

$$\bar{H}_i(l) = (-\alpha H_{i,p}(-1)e^{-j2\pi n_p/N} + (1+\alpha e^{-j2\pi n_p/N})H_{i,p}(0) - H_{i,p}(1))e^{-j2\pi n_p(2l)/N},$$

[Equation 27]

$$\bar{I}_i(l) = \sum_{m=0,m\neq k}^{N/2-1}\left(\sum_{p=0}^{P-1}\begin{pmatrix}-\alpha H_{i,p}(2(l-m)-1)e^{-j2\pi n_p/N} + (1+\alpha e^{j2\pi n_p/N})\\ H_{i,p}(2(l-m)) - H_{i,p}(2(l-m)+1)\end{pmatrix}e^{-j2\pi n_p(2m)/N}\right)X_i(m)$$

$$N(l) = W(2l) - W(2l+1)$$

When the channels of the two adjacent data groups are the same in the equation 26, i.e., $\bar{H}_1(l)\approx\bar{H}_1(l+1)$ and $\bar{H}_2(l)\approx\bar{H}_2(l+1)$, then the SFBC combination is expressed as follows:

$$\hat{X}(l)=(|\bar{H}_1(l)|^2+|\bar{H}_2(l)|^2)X(l)+\bar{H}_1{}^*(l)(\bar{I}_1(l)+\bar{I}_2(l)+N(l)+\bar{H}_2(l)(\bar{I}_1(l+1)+\bar{I}_2(l+1)+N(l+1))^*$$

$$\hat{X}(l+1)=(|\bar{H}_1(l)|^2+|\bar{H}_2(l)|^2)(X(l+1)-\bar{H}_1(l)(\bar{I}_1(l+1)+\bar{I}_2(l+1)+N(l+1))^*+\bar{H}_2{}^*(l)(\bar{I}_1(l)+\bar{I}_2(l)+N(l))$$

[Equation 28]

Finally, the transmitted signals are recovered through the ML (Maximum Likelihood) detection method according to the equation 27.

In the MIMO-OFDM system based on the SFBC, a great diversity gain can be achieved when the coherence bandwidth is greater than the distance between the sub-channels. Although the system with two transmit antennas and one receive antenna has been described in the second embodiment of the present invention, the transmitting and receiving method according to the embodiment of the present invention is also applicable to the OFDM system with NTx transmit antennas and NRx receive antennas in the same manner as described above.

Figure 11:
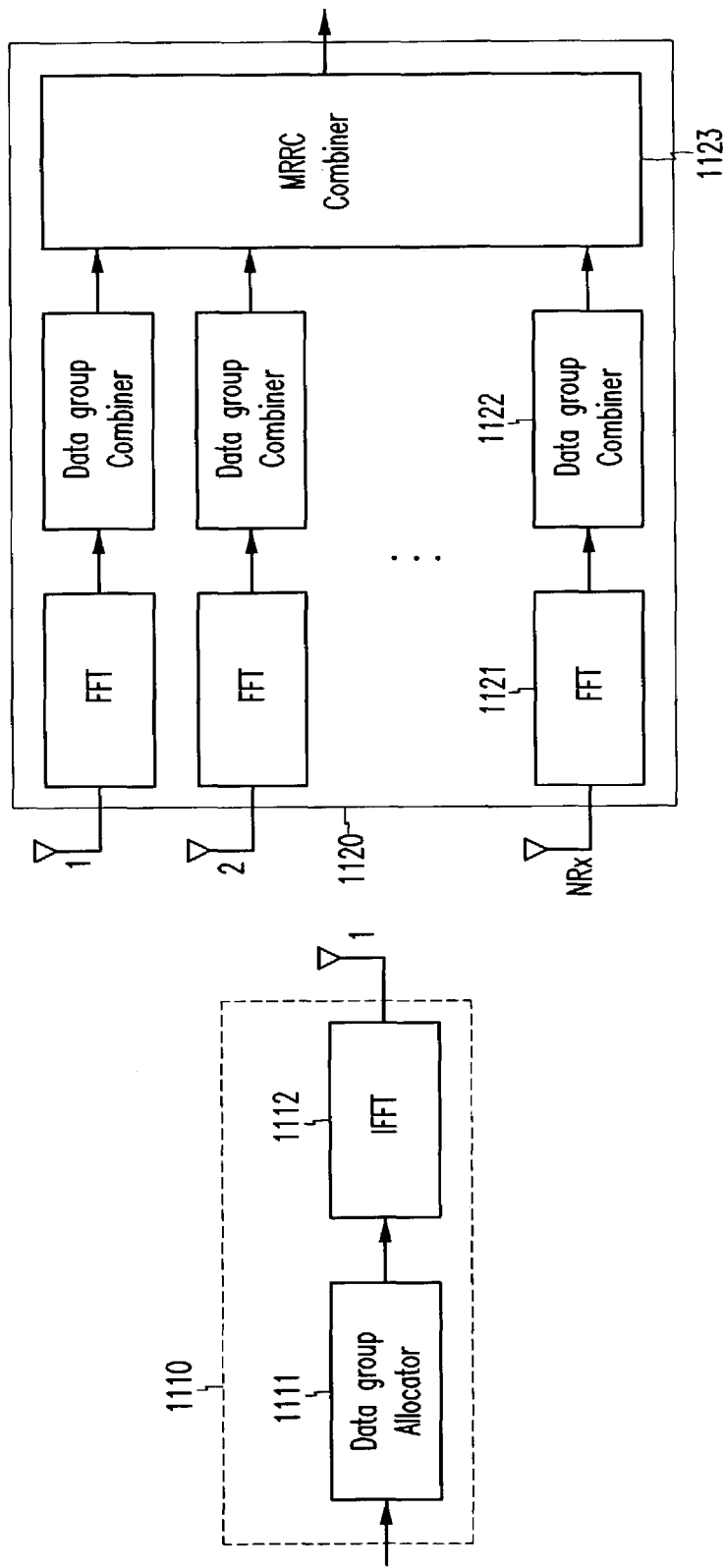
FIG. 11 is a block diagram of an MRRC-OFDM system for reducing a time-varying channel distortion according to a third embodiment of the present invention.

FIG. 11 is a block diagram of an MRRC-OFDM system with NRx receive antennas according to a third embodiment of the present invention. For simplification of the equations, it is assumed that M=2, $M_R$=1, and $M_L$=0. When the weight value of the individual sub-channel is the same as given by the equation 11, the received signal at the nRx-th receive antenna can be expressed as follows:

$$Y_{nRx}(2l+j) = \sum_{m=0}^{N/2-1}\left(\sum_{p=0}^{P-1}(H_{nRx,p}(2(l-m)+j)-\alpha H_{nRx,p}(2(l-m)+j-1)\right.$$

$$\left. e^{-j2\pi n_p/N}\right)$$

$$\left.e^{-j2\pi n_p(2m)/N}\right)X(m)+W(2l+ \qquad \text{[Equation 29]}$$

for $l = 0, 1, 2, \cdots, N/2-1$; and $j = 0, 1$

In the above equation, a combination of adjacent sub-channels by the respective antennas results in the following equation:

$$\overline{Y}_{nRx}(l)=Y_{nRx}(2l)-Y_{nRx}(2l+1)=X(l)\overline{H}_{nRx}(l)+\overline{I}_{nRx}(l)+N_{nRx}(l) \qquad \text{[Equation 30]}$$

Here, the channel, the time-varying channel distortion, and the noise term are given by:

$$\overline{H}_{nRx}(l) = (-\alpha H_{nRx,p}(-1)e^{-j2\pi n_p/N} + (1+\alpha e^{-j2\pi n_p/N})H_{nRx,p}(0)-H_{nRx,p}(1))e^{-j2\pi n_p(2l)/N} \qquad \text{[Equation 31]}$$

$$\overline{I}_{nRx}(l) = \sum_{m=0,m\neq k}^{N/2-1}\left(\sum_{p=0}^{P-1}\binom{-\alpha H_{nRx,p}(2(l-m)-1)e^{-j2\pi n_p/N}+}{(1+\alpha e^{-j2\pi n_p/N})H_{nRx,p}(2(l-m))-H_{nRx,p}(2(l-m)+1)}\right)e^{-j2\pi n_p(2m)/N}X(m)$$

$$N_{nRx}(l) = W_{nRx}(2l)-W_{nRx}(2l+1)$$

The equations 30 and 31 are the same as the equations 20 and 21, except that the system has NRx receive antennas. When the receiver knows about the terms formed by a combination of the adjacent sub-channels in the equation 30, MRRC combination is enabled as follows:

$$\hat{X}(l) = \sum_{nRx=1}^{NRx}\overline{Y}_{nRx}(l)\overline{H}^*_{nRx}(l) \qquad \text{[Equation 32]}$$

$$= \sum_{nRx=1}^{NRx}|\overline{H}_{nRx}(l)|^2 X(l)+\overline{I}_{nRx}(l)\overline{H}^*_{nRx}(l)+N_{nRx}(l)\overline{H}^*_{nRx}(l)$$

The combined signals of the equation 32 are demodulated by the ML detection method to reduce the time-varying channel distortion and achieve a diversity gain through the received MRRC.

The above-stated MRRC-OFDM method for reduction of the time-varying channel distortion can be particularly useful in uplink since the hardware complexity of the user terminal can be significantly reduced in the mobile communication system.

Figure 12:
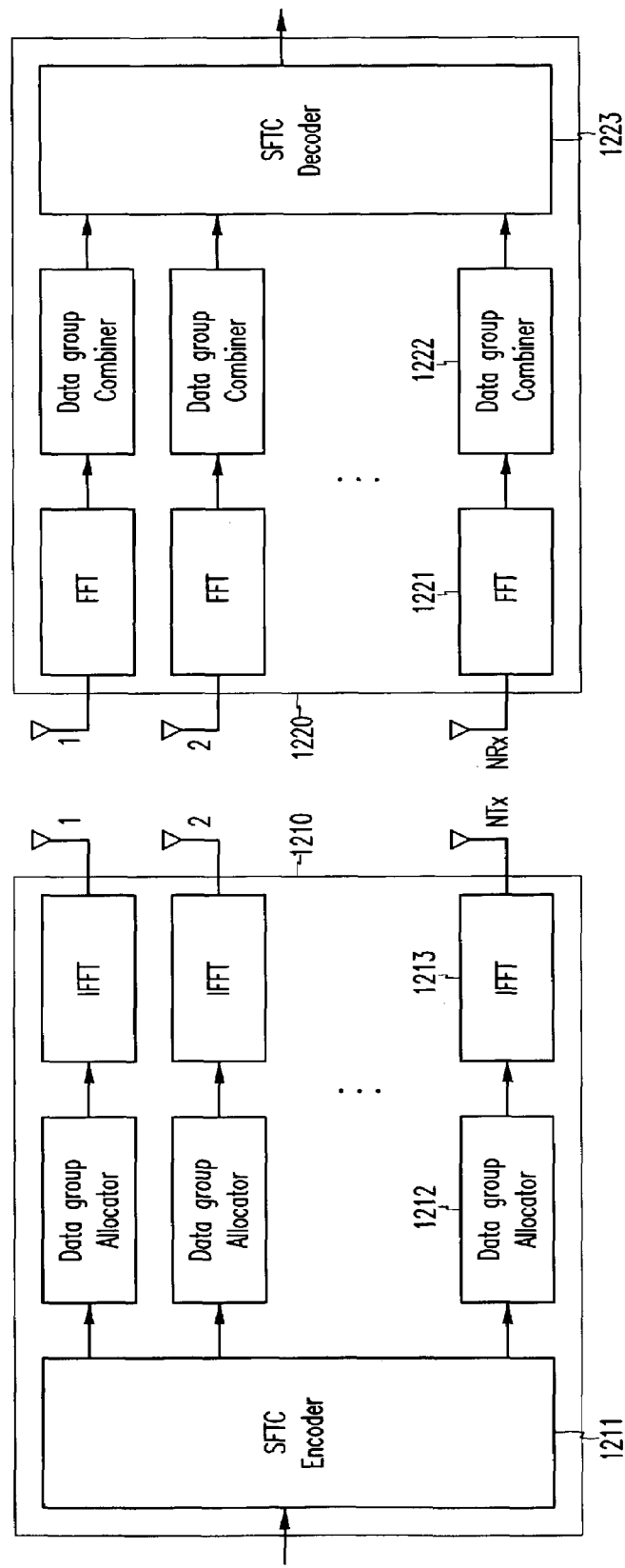
FIG. 12 is a block diagram of an SFTC-OFDM system for reducing a time-varying channel distortion according to a fourth embodiment of the present invention.

FIG. 12 is a block diagram of an SFTC-OFDM system for reducing a time-varying channel distortion according to a fourth embodiment of the present invention. Referring to FIG. 12, a Trellis encoder 1211 encodes the respective data the same way as in the conventional SFTC-OFDM in the frequency domain, and then a data group allocator 1212 allocates sub-channels to the sub-carrier group with a weight value for each antenna as shown in FIG. 6. In a receiver 1220, a data group combiner 1222 combines the respective data groups and a Trellis decoder 1216 decodes the combined data groups. For simplification of the equations, it is assumed in the fourth embodiment of the present invention that M=2, $M_R$=1, and $M_L$=0. But the present invention is not specifically limited to the above range.

The nRx-th received signal is expressed by the following equation:

$$Y_{nRx}(2l+j) = \sum_{m=0}^{N/2-2}\sum_{nTx=1}^{NTx}\left(\sum_{p=0}^{P-1}(H_{nTx,nRx,p}(2(l-m)+j)-\right. \qquad \text{[Equation 33]}$$

$$\alpha H_{nTx,nRx,p}(2(l-m)+j-1)e^{-j2\pi n_p/N})$$

$$\left.e^{-j2\pi n_p(2m)/N}\right)X_{nTx}(m)+W(2l+j)$$

for $l = 0, 1, 2, \cdots, N/2-1$; and $j = 0, 1$ where $H_{nTx,nRx,p}(m)$ is the single-tone response of a channel formed between the nTx-th transmit antenna and nRx-th receive antenna; and $X_{nTx}(m)$ is a signal of the m-th sub-channel transmitted through the nTx-th antenna. The above equation can be rewritten as follows by a combination of adjacent channels:

$$Y_{nRx}(l) = Y_{nRx}(2l)-Y_{nRx}(2l+1) \qquad \text{[Equation 34]}$$

$$= \sum_{nTx=1}^{NTx}(\overline{H}_{nTx,nRx}(l)X_{nTx}(l)+\overline{I}_{nTx}(l))+N_{nRx}(l)$$

Here, the channel for each path, the time-varying channel distortion, and the noise term are given by:

$$\bar{H}_{nTx,nRx}(l) = \sum_{p=0}^{P-1}(-\alpha H_{nTx,nRx,p}(-1)e^{-j2\pi n_p/N} + (1+\alpha e^{-j2\pi n_p/N})H_{nTx,nRx,p}(0) - H_{nTx,nRx,p}(1))e^{-j2\pi n_p(2l)/N}$$ [Equation 35]

$$\bar{I}_{nTx}(l) = \sum_{m=0,m\neq k}^{N-1}\left(\sum_{p=0}^{P-1}\binom{-\alpha H_{nTx,nRx,p}(2(l-m)-1)e^{-j2\pi n_p/N} +}{(1+\alpha e^{-j2\pi n_p/N})H_{nTx,nRx,p}(2(l-m)) - H_{nTx,nRx,p}(2(l-m)+1)}\right)e^{-j2\pi n_p(2m)/N}X_{nTx}(m)$$

$$N_{nRx}(l) = W_{nRx}(2l) - W_{nRx}(2l+1)$$

The combined signal from adjacent channels in the frequency domain is sent to Viterbi decoding block where the branch metric criterion is used for data recovery as in the following equation:

$$\sum_{nRx=1}^{NRx}\left|\bar{Y}_{nRx}(l) - \sum_{nTx=1}^{NTx}\bar{H}_{nTx,nRx}(l)X_{nTx}(l)\right|^2$$ [Equation 36]

The SFTC-OFDM system for reducing a time-varying channel distortion according to the fourth embodiment of the present invention involves assigning a weight value for reduction of the time-varying channel distortion to the adjacent sub-channels of each antenna, combining the adjacent sub-channels at the receiver, and applying a Viterbi algorithm, thereby achieving both a diversity gain and a coding gain.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, while the conventional OFDM system causes a significant performance degradation due to a time-varying channel distortion, the present invention mathematically analyzes the effect of the time-varying channel by approximation and thereby reduces the effect of a distortion caused by the time-varying channel.

The transmission method and the channel estimation method as described above can be applied to an OFDM system with multiple antennas.

Accordingly, the reduction method of a time-varying channel distortion for MIMO-OFDM systems by the present invention is applicable to SFBC-OFDM, SFTC-OFDM or MRRC-OFDM, where the time-varying channel distortion can be reduced to guarantee a high diversity gain and improve the wireless link budget.

The above-stated advantages of the present invention can provide a high-speed mobility in the OFDM system.

What is claimed is:

1. A transmitting method, which is a signal transmitting method for an OFDM (Orthogonal Frequency Division Multiplex) system using at least one antenna, the transmitting method comprising:
    (a) putting M adjacent sub-channels among N entire sub-channels in one group;
    (b) assigning a weight value to each transmit data of the respective sub-channels in the group; and
    (c) transmitting the transmit data in the unit of groups with the weight value assigned thereto;

wherein said assigning comprises: approximating a time-varying channel using a polynomial function, calculating a power leakage value affecting the adjacent sub-channels in a frequency domain using coefficients of the approximated polynomial function, and determining a weight value to be assigned to each transmit data based on the power leakage value.

2. The transmitting method as claimed in claim 1, wherein said putting comprises dividing the N sub-channels into N/M data groups,
    the step (b) comprising assigning the weight value calculated by using the approximated time-varying channel to the M adjacent sub-channels in each data group.

3. The transmitting method as claimed in claim 1, wherein when channel information is not available at the transmitter, the step (a) comprises:
    putting M adjacent sub-channels in one data group and assigning a weight value to the M sub-channels in the data group according to the following equation:

$$(-1)^i \frac{(M-1)!}{i!(M-1-i)!}$$

wherein i is an index in the group.

4. The transmitting method as claimed in claim 1, further comprising:
    with a time-varying channel distortion generated, arranging pilot signals in groups and assigning a weight value less than the weight value of the transmit data to the pilot signals when a power of the pilot signal is greater than a power of the transmit data, thereby reducing the time-varying channel distortion caused by the pilot signals.

5. A receiving method, which is a signal receiving method for an OFDM system using at least one antenna, the receiving method comprising:
    (a) receiving signals having M adjacent sub-channels among N entire sub-channels in one group, each sub-channel in the group having a weight value assigned thereto;
    (b) combining the received signals of the sub-channels in the group; and
    (c) demodulating the combined signals;
    wherein said receiving comprises: taking FFT (Fast Fourier Transform) of the received signal and combining the M sub-channels in each data group by addition or subtraction according to a sign of the weight value.

6. The receiving method as claimed in claim 5, wherein the step (a) comprises: taking FFT of the received signal and combining them by subtracting a signal of the sub-channel in the data group transmitted with a weight value having a negative (−) sign from a signal of the sub-channel transmitted with a weight value having a positive (+) sign, when the received signals have two sub-channels in one data group, the signal assigned to the one sub-channel in the data group having an opposite sign to the signal assigned to the other sub-channel.

7. A transmitting and receiving method, which is a signal transmitting and receiving method for an OFDM system using at least one antenna, the transmitting and receiving method comprising:
(a) putting M adjacent sub-channels among N entire sub-channels in one group;
(b) assigning a weight value calculated by using an approximated time-varying channel to each transmit data of the M adjacent sub-channels in the group;
(c) receiving signals and combining the received signals of the M sub-channels in each data group by addition or subtraction according to a sign of the weight value; and
(d) demodulating the combined signals.

8. The transmitting and receiving method as claimed in claim 7, wherein when channel information is not available at the transmitter, the step (a) comprises:
putting M adjacent sub-channels in one data group, assigning a weight value to the M sub-channels in the data group according to the following equation, and transmitting them:

$$(-1)^i \frac{(M-1)!}{i!(M-1-i)!}$$

wherein i is an index in the group,
the step (c) comprising: taking FFT of the received signal and combining the signals of the M sub-channels in each data group by addition or subtraction according to a sign of the weight value.

9. The transmitting and receiving method as claimed in claim 7, further comprising:
with a time-varying channel distortion generated, arranging pilot signals in groups and assigning a weight value less than the weight value of the transmit data to the pilot signals when a power of the pilot signal is greater than a power of the transmit data, thereby reducing the time-varying channel distortion caused by the pilot signals.

10. A transmitting and receiving method, which is a signal transmitting and receiving method for an MIMO(Multi-Input Multi-Output)-OFDM system using NTx transmit antennas and NRx receive antennas, the transmitting and receiving method comprising:
(a) putting M adjacent sub-channels among N entire sub-channels in one group;
(b) assigning a weight value to each transmit data of the M adjacent sub-channels in the data group, and sending the transmit data through the NTx transmit antennas;
(c) receiving the signals through the NRx receive antennas, and combining the signals of the M sub-channels in each data group of the antenna-based received signals; and
(d) demodulating the combined signals;
wherein said assigning comprises: approximating a time-varying channel using a polynomial function, calculating a power leakage value affecting the adjacent sub-channels in a frequency domain using coefficients of the approximated polynomial function, and determining a weight value to be assigned to each transmit data based on the power leakage value.

11. The transmitting and receiving method as claimed in claim 10, wherein the said putting comprises dividing the N sub-channels into N/M data groups,
the step (b) comprising assigning the weight value calculated by using the approximated time-varying channel to the M adjacent sub-channels in each data group.

12. The transmitting and receiving method as claimed in claim 10, wherein when channel information is not available at the transmitter, the step (a) comprises:
putting M adjacent sub-channels in one data group, assigning a weight value to the M sub-channels in the data group according to the following equation, and transmitting them:

$$(-1)^i \frac{(M-1)!}{i!(M-1-i)!}$$

wherein i is an index in the group,
the step (c) comprising: taking FFT of the received signal and combining the signals of the M sub-channels in each data group by addition or subtraction according to a sign of the weight value.

13. The transmitting and receiving method as claimed in claim 10, wherein when the system is an SFBC(Space-Frequency Block Coded)-OFDM system, the step (b) comprises transmitting the data group with a weight value assigned to the M adjacent sub-channels through the respective transmit antennas according to an SFBC orthogonal matrix,
the step (c) comprising: combining the signals of the M sub-channels of each data group by the receive antennas by addition or subtraction according to a sign of the weight value and then subjecting the received signals to SFBC combination.

14. The transmitting and receiving method as claimed in claim 13, wherein when channel information is not available at the transmitter, the step (b) comprises:
putting M adjacent sub-channels in one data group, assigning a weight value to the M sub-channels in the data group according to the following equation and transmitting the signals through the respective transmit antennas according to the SFBC orthogonal matrix:

$$(-1)^i \frac{(M-1)!}{i!(M-1-i)!}$$

wherein i is an index in the group,
the step (c) comprising: combining the signals of the M sub-channels in each data group by the receive antennas by addition or subtraction according to a sign of the weight value and then subjecting the received signals to SFBC combination.

15. The transmitting and receiving method as claimed in claim 10, wherein when the system is an MRRC(Maximal Ratio Receiver Combining)-OFDM system, the step (b) comprises transmitting the data group with a weight value assigned to the M adjacent sub-channels through one transmit antenna,
the step (c) comprising: combining the signals of the M sub-channels of each data group by the NRx receive antennas by addition or subtraction according to a sign of the weight value and then subjecting the received signals to MRRC combination.

16. The transmitting and receiving method as claimed in claim 15, wherein when channel information is not available at the transmitter, the step (b) comprises:

putting M adjacent sub-channels in one data group, assigning a weight value to the M sub-channels in the data group according to the following equation and transmitting the signals through one transmit antenna:

$$(-1)^i \frac{(M-1)!}{i!(M-1-i)!}$$

wherein i is an index in the group, the step (c) comprising: combining the signals of the M sub-channels in each data group by addition or subtraction according to a sign of the weight value and then subjecting the received signals to MRRC combination.

17. The transmitting and receiving method as claimed in claim 10, wherein when the system is an SFTC(Space-Frequency Trellis Coded)-OFDM system, the step (b) comprises: performing SFTC coding and transmitting the data group with a weight value assigned to the M adjacent sub-channels through the respective transmit antennas, the step (c) comprising: combining the signals of the M sub-channels of each data group by the receive antennas by addition or subtraction according to a sign of the weight value and then subjecting the combined signals to SFTC decoding.

18. The transmitting and receiving method as claimed in claim 17, wherein when channel information is not available at the transmitter, the step (b) comprises:

performing SFTC coding, putting M adjacent sub-channels in one data group, assigning a weight value to the M sub-channels in the data group according to the following equation and transmitting the signals through the respective transmit antennas:

$$(-1)^i \frac{(M-1)!}{i!(M-1-i)!}$$

wherein i is an index in the group, the step (c) comprising: combining the signals of the M sub-channels in each data group by the receive antennas by addition or subtraction according to a sign of the weight value and then subjecting the combined signals to SFTC decoding.

* * * * *